Figure 1:
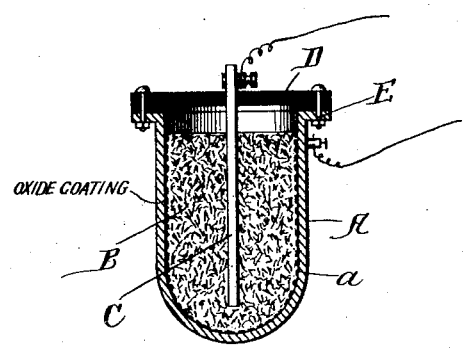

No. 856,162. PATENTED JUNE 4, 1907.
I. KITSEE.
FIRE ALARM CIRCUIT.
APPLICATION FILED OCT. 31, 1902.

Witnesses
E. R. Stilley

Inventor

UNITED STATES PATENT OFFICE.

ISIDOR KITSEE, OF PHILADELPHIA, PENNSYLVANIA.

FIRE-ALARM CIRCUIT.

No. 856,162.   Specification of Letters Patent.   Patented June 4, 1907.

Application filed October 31, 1902. Serial No. 129,613.

*To all whom it may concern:*

Be it known that I, ISIDOR KITSEE, of the city and county of Philadelphia, State of Pennsylvania, have invented certain new and useful Improvements in Fire-Alarm Circuits, of which the following is a specification.

My invention relates to an improvement in fire alarm circuits, and its object is to provide such circuits with a device capable of acting as a generator of electricity through the action of a high temperature due to a conflagration.

In all fire alarm circuits of to-day, besides the circuit proper and apart from the alarms or annunciators, two distinct devices have to to be employed, one, the generator of electricity usually in the form of a primary or secondary battery, and the other, a thermostatic device sometimes in the form of two materials capable of different expansion and therefore capable of making or breaking the circuit in the presence of a high temperature, or fusible links alone or in connection with spring or otherwise actuated devices.

To persons versed in the art, the difficulty of maintaining an efficient primary cell for a great length of time is well known, so also is well known the difficulty arising from thermostatic devices. And it is the aim of my invention to so combine both of these devices that a generator of electricity and thermostat efficient just at the time when needed results therefrom.

In Letters Patent No. 713,652, November 18, 1902, I described and claimed a device which I called a "thermo-electric generator" and which device is based on the principle, that a material solid and non-conducting at low temperature and liquid and conducting at high temperature is made to act as the electrolyte in the presence of two conductors capable of producing a difference of potential in the presence of such electrolyte. I have, in this application, given as an example, acetate of sodium as one of the materials which may be employed in such cells; but where it is necessary that the cell shall give a comparatively great strength of current and should work uninterrupted for a comparative long period and where the cell may have to remain for months or even years in a non-conducting state and may be only called on at very great intervals to act as generator, it is best to provide such cells with a depolarizing material whereby the action of the cell is prolonged. Different electrodes can be employed with such cell and the depolarizing material may consist of different metallic salts and I have illustrated in the drawing accompanying this specification, a cell which in practice has proven efficient enough for the purpose as stated.

Figure 2:
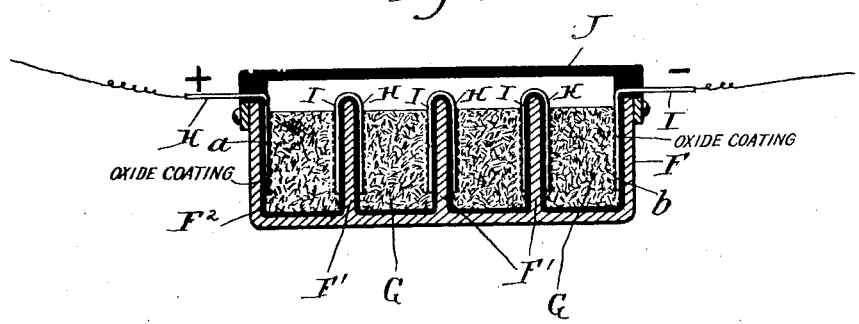
Figure 3:
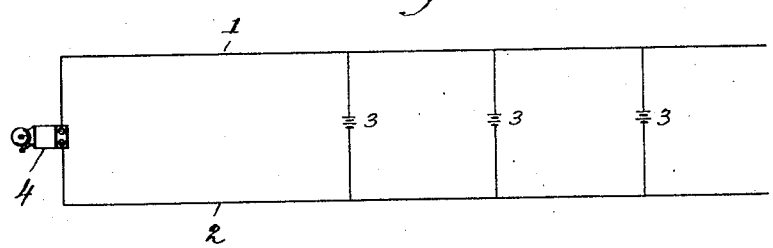

Referring to the drawing:—Figure 1 is a vertical sectional view of a cell or generator called by me "thermo-electric cell or generator." Fig. 2 is a vertical sectional view wherein a series of elements are combined into one receptacle so as to be capable of giving out a current of higher E. M. F. Fig. 3 is a diagrammatic view of a fire alarm circuit provided with my device.

In Fig. 1, A is the receptacle containing the material B designed to act as the electrolyte when heated; C is a second material designed to act as an electrode; D is the non-conducting cover and E are means to secure the cover tightly to the receptacle.

As said above, the cell illustrated has proven efficient for all practical purposes and the material of which this cell consisted was as follows:—The outer receptacle A consisted of copper about 1/32″ thick. The inner surface of this copper receptacle was, through electrolytic action, provided with a coating of oxid in the following manner:— The receptacle was filled with a caustic or alkaline solution (hydrate of potassium), a zinc rod was then placed in this solution and then the copper connected to the positive charging pole and the zinc rod to the negative charging pole. Through the action of the current, the copper becomes oxidized but no action will take place on the zinc. After the oxidation was carried on to the necessary degree, the receptacle was emptied and dried and hydrate of potassium in its solid and dry state was then with the aid of heat liquefied and poured into the receptacle. As soon as the temperature of this solution became low enough, the hydrated potassium again solidified and formed a solid mass. The zinc rod was placed, before such solidification took place, in a position as is illustrated. As long as the potassium salt retained its high temperature and remained therefore in its liquid state, the cell gave at the beginning 1.10 volts and on short-circuit over 3 amperes, but when solidification set in, no electro-motive force could be obtained and the cell acted not only as being in its inactive state but acted as a comparative high resistance and stopped the flow of the current in a circuit wherein 1 ampere was flowing at a pressure of 5 volts.

It will therefore be seen, that whereas this cell is efficient as a generator of electricity as long as, through a high temperature, the material acting as the electrolyte is in its liquid state, it becomes for all practical purposes inert as soon as, through a low temperature, solidification sets in.

I have given above a description of a cell consisting of copper and zinc as electrodes, oxid of copper as depolarizer, and hydrated potash in its solid state as the medium between these two electrodes, but it is obvious that other metals, other depolarizers, or other metallic salts may be employed without departing from the scope of my invention.

In Fig. 2, F is the receptacle provided with the partitions F—1 and the insulating lining F—2. The solid material, designed to act as electrolyte when heated, is designated by the letter G, and the electrodes are designated by the letters H and I respectively.

The cell is made in the form well known as "multiple-cell" and the electrodes straddle the partitions; these electrodes I prefer to make of a strip of copper, one-half of the length of this strip is provided with the oxid and the other half is provided with an electro-deposition of zinc, so that one part of the strip may act as the positive electrode in one compartment and the other part of the strip may act as negative in a second compartment.

The oxidation as well as the electro-deposition is made with the aid of an electric current in an electrolytic cell. In the drawing I have designated the oxid of copper by the letter $a$ and the coating of zinc by the letter $b$. The end electrode I may consist of zinc alone and the end electrode H may consist of copper, the surface of which is oxidized.

As it is intended to use these cells in connection with fire alarm circuits it is necessary to make the receptacle F of a material capable of withstanding the action of heat, but capable of being raised to a high temperature, and I therefore prefer to make this receptacle of iron, and as iron is a conductor, it is necessary to line the same with a non-conducting material, such for instance as one of the well known cements capable of withstanding the action of heat.

As hydrated potassium eagerly absorbs the moisture from the air when in contact with same for a great length of time, it is necessary to close the receptacle, and I therefore have provided the same with a non-conducting covering designated in the drawing by the letter J; but this covering may consist of iron if desired, and in this case, it has to be insulated from the receptacle proper.

In Fig. 3, 1 and 2 are the main line-wires; 4 is an alarm and 3 are the thermo-electric devices such as above described.

Having now described my invention, what I claim as new and desire to secure by Letters Patent is:—

In a device of the class described, a circuit, an annunciating device in said circuit, a series of devices in multiple arc at different points of said circuit, each of said devices normally non-conducting to the flow of a straight or voltaic current, but conductive in the presence of high temperature, said devices also acting as generators of electricity.

In testimony whereof, I hereby sign my name in the presence of two subscribing witnesses, this fourth day of September, A. D. 1902.

ISIDOR KITSEE.

Witnesses:
EDITH R. STILLEY,
CHAS. KRESSENBACH.